United States Patent [19]
Cecchi et al.

[11] Patent Number: 5,666,354
[45] Date of Patent: Sep. 9, 1997

[54] CMOS BI-DIRECTIONAL DIFFERENTIAL LINK

[75] Inventors: Delbert Raymond Cecchi; Curtis Walter Preuss, both of Rochester; Donald Joseph Schulte, Eagan, all of Minn.

[73] Assignee: International Business Machines Corporation, Armonk, N.Y.

[21] Appl. No.: 575,827

[22] Filed: Dec. 20, 1995

[51] Int. Cl.$^6$ ............................ H04B 1/56; H04L 5/14
[52] U.S. Cl. ..................... 370/284; 330/259; 375/259
[58] Field of Search .................. 370/24, 27, 28, 370/276, 282, 284; 375/219, 220, 259, 257; 330/252, 253, 259, 261

[56] References Cited

U.S. PATENT DOCUMENTS

| | | | |
|---|---|---|---|
| 3,983,324 | 9/1976 | Lacher | 370/27 |
| 4,162,371 | 7/1979 | Belforte | 370/27 |
| 4,393,494 | 7/1983 | Belforte et al. | 370/27 |
| 4,638,473 | 1/1987 | Cooperman et al. | 370/27 |
| 4,958,133 | 9/1990 | Bazes | 330/259 |
| 5,216,667 | 6/1993 | Chu et al. | 370/24 |
| 5,287,386 | 2/1994 | Wade et al. | 375/257 |
| 5,361,040 | 11/1994 | Barrett, Jr. | 330/253 |
| 5,412,688 | 5/1995 | Marbot | 375/220 |
| 5,541,535 | 7/1996 | Cao et al. | 370/27 |

OTHER PUBLICATIONS

IEEE Journal of Solid-State Circuits, IEEE Solid-State Circuit Council, Two Novel Fully Complementary Self-Biased CMOS Differential Amplifiers, vol. 26, No. 2, Feb., 1991, pp. 1, 165-168.

*Primary Examiner*—Hassan Kizou
*Attorney, Agent, or Firm*—Merchant & Gould

[57] ABSTRACT

A full-duplex, differential, bi-directional communications link for simultaneously transmitting differential data between electronic devices is provided. Each transceiver coupled to the communications channel comprises a CMOS (Complementary Metal-Oxide Semiconductor) differential driver and receiver. The differential driver provides constant CMOS voltage sources for providing stable data signal transmission at reduced voltage levels. Voltage sources providing a data signal voltage different from the desired data signal voltage can be placed into a high impedance mode to allow the desired data signal voltage to be transmitted on the common line. The differential receiver includes self-biasing feedback circuitry to provide biasing voltages to the circuit while avoiding manufacturing difficulties associated with providing precise bias voltages. The complementary amplifier structure of the receiver provides an increased common mode noise tolerance. The receiver further includes signal separation circuitry to separate the desired recipient signals on the communications channel from those signals which are driven to another differential receiver.

50 Claims, 13 Drawing Sheets

CMOS BI-DIRECTIONAL DIFFERENTIAL LINK

FIELD OF THE INVENTION

The present invention relates to the full-duplex transmission of differential data, and more particularly to a full-duplex, bi-directional, differential communications link having low power consumption and a high tolerance to electrical noise.

BACKGROUND OF THE INVENTION

A bi-directional link can be used in any situation where two devices must communicate with each other. A first communicating device can send data to a second communicating device, while the second communicating device can be sending data to the first communicating device. Conventional methods of simultaneously transmitting data between multiple devices included the use of separate unidirectional links between each driver and receiver. The advantages of bi-directional links over conventional methods include a reduction in the wiring between communicating devices, and a reduction in the number of connector pins on each communicating device.

Such a bi-directional link is disclosed in U.S. Pat. No. 5,216,667 issued on Jun. 1, 1993 to Chu et al. This reference describes a bi-directional transceiver for use on a full-duplex link. However, it uses a single wire for signaling, which has a limited tolerance to noise. Furthermore, a local reference voltage is required to compare with received signals.

Differential signaling is often used in signal transmission where undesirable electrical noise may be induced on the transmission line. Such electrical noise in single-wire signaling can cause the signal voltage to rise above or fall below its acceptable threshold voltage, resulting in faulty switching at the receiving end. Differential signaling, on the other hand, simultaneously transmits two signals that are complements of one another. The logic state of a particular bit of information transmitted by a differential signal can be determined by taking the difference of the two signals' voltage levels. Since these two signals are transmitted on physically adjacent transmission lines, electrical noise induced on one line is also induced on the other. Undesirable noise therefore may affect the two signals, but the difference between the two remains substantially the same. The advantages of differential signaling are well-known for conventional differential links.

A bi-directional link utilizing differential signaling is shown in U.S. Pat. No. 4,638,473, by Cooperman et al., issued Jan. 20, 1987. The Cooperman et al. differential design subtracts the differential line voltages in the receiver through the use of alternately switching capacitors. For proper operation, the capacitors must switch at about five times the transmission bit rate. This design substantially limits the data transfer rate, as the data rate can only be as high as one-fifth of the switching speed of the device technology.

Another differential bi-directional link is presented in U.S. Pat. No. 4,393,494, by Belforte et al., issued Jul. 12, 1983. The Belforte design uses external biasing voltages in providing current generators within the receiver. Also, the Belforte reference describes a driver circuit which relies on pull-down resistors to establish the low logic level of the transmitted signal.

The various embodiments of the present invention overcomes many of these problems. The data rate limitation of Cooperman et al. is avoided by utilizing a Complementary Metal-Oxide Semiconductor (CMOS) circuit rather than an alternating capacitor scheme as in the Belforte et al. reference. The CMOS technology provides for a bi-directional, differential link which reduces power consumption, and allows high data rate transfers. Furthermore, some embodiments of the present invention show a differential receiver that does not require additional internal or external biasing voltages, but rather implements a self-biasing scheme which greatly reduces the manufacturing difficulties associated with providing precise bias voltages, and may reduce receiver input counts where external bias voltages would be provided. A complementary receiver design offers an increased common mode noise tolerance. The complementary structure provides for a wide common mode range, ranging approximately from one power supply rail to the other. Constant voltage sources are also provided in the differential driver to generate the driver output signals to the bi-directional link. This provides an advantage over the use of pull-down resistors in that the magnitude of the transmitted signal can be reduced, and the required bias current is less than where pull-down resistors are used, which results in reduced power consumption.

SUMMARY OF THE INVENTION

The CMOS (Complementary Metal-Oxide Semiconductor) Differential Bi-directional Link provides a full-duplex, differential communications link for transmitting data. The link comprises transceivers coupled by way of a transmission line. Each transceiver coupled to the communications channel of the bi-directional link comprises a CMOS differential driver and a CMOS differential receiver. The differential CMOS receivers utilize complementary self-biasing differential amplifiers. The differential CMOS drivers within the transceivers include CMOS constant voltage sources to drive the data.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawings and description are to be regarded as illustrative in nature, and not as restrictive.

DETAILED DESCRIPTION OF THE PREFERRED EMBODIMENTS

Figure 1:
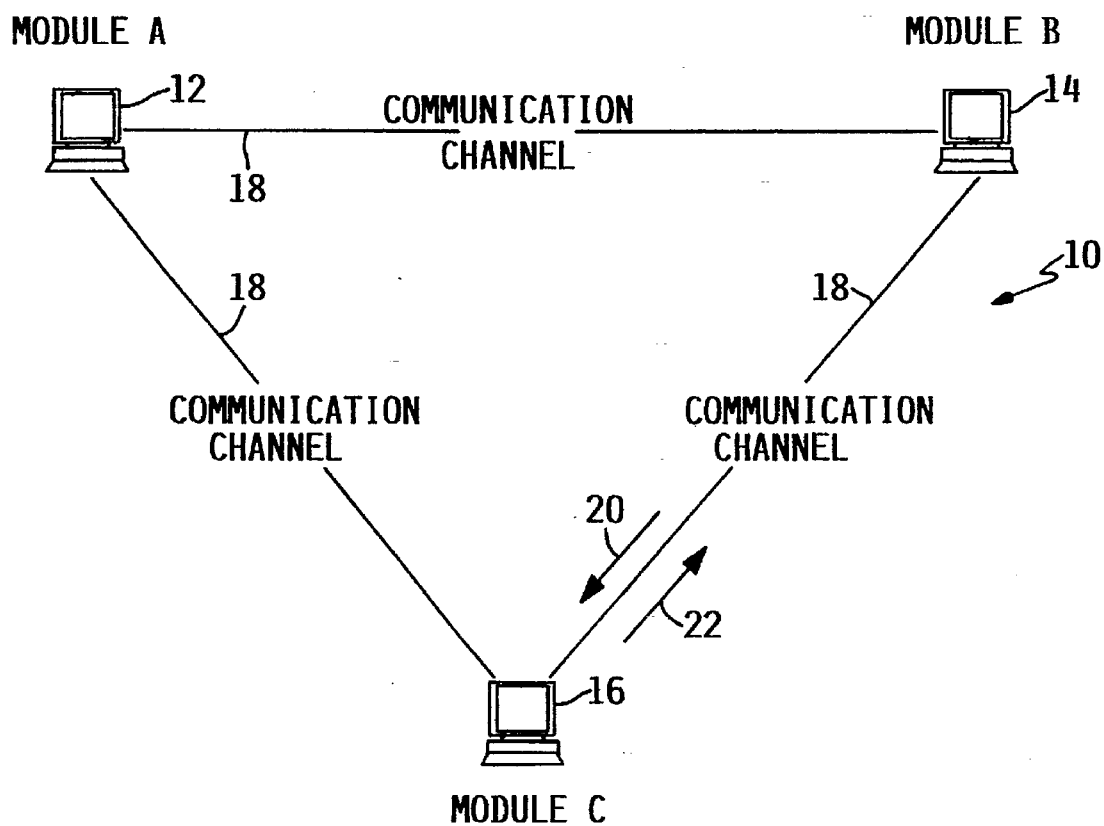
FIG. 1 is a diagram of a typical networked system having multiple computing modules.

FIG. 1 is a diagram of a typical networked system 10 having multiple computing modules. It is often necessary that data be communicated between the modules of a system. Module A 12, Module B 14 and Module C 16 are interconnected via communication channels 18, which provide the medium for the electronic transmission of data. In full duplex systems, data can be simultaneously transmitted in both directions of a communication channel, as shown by arrows 20 and 22. Bi-directional links between modules provide for the simultaneous transfer of this data. Bi-directional links can be used in any electronic communication environment, and is not limited to communication between computing modules.

Figure 2A:
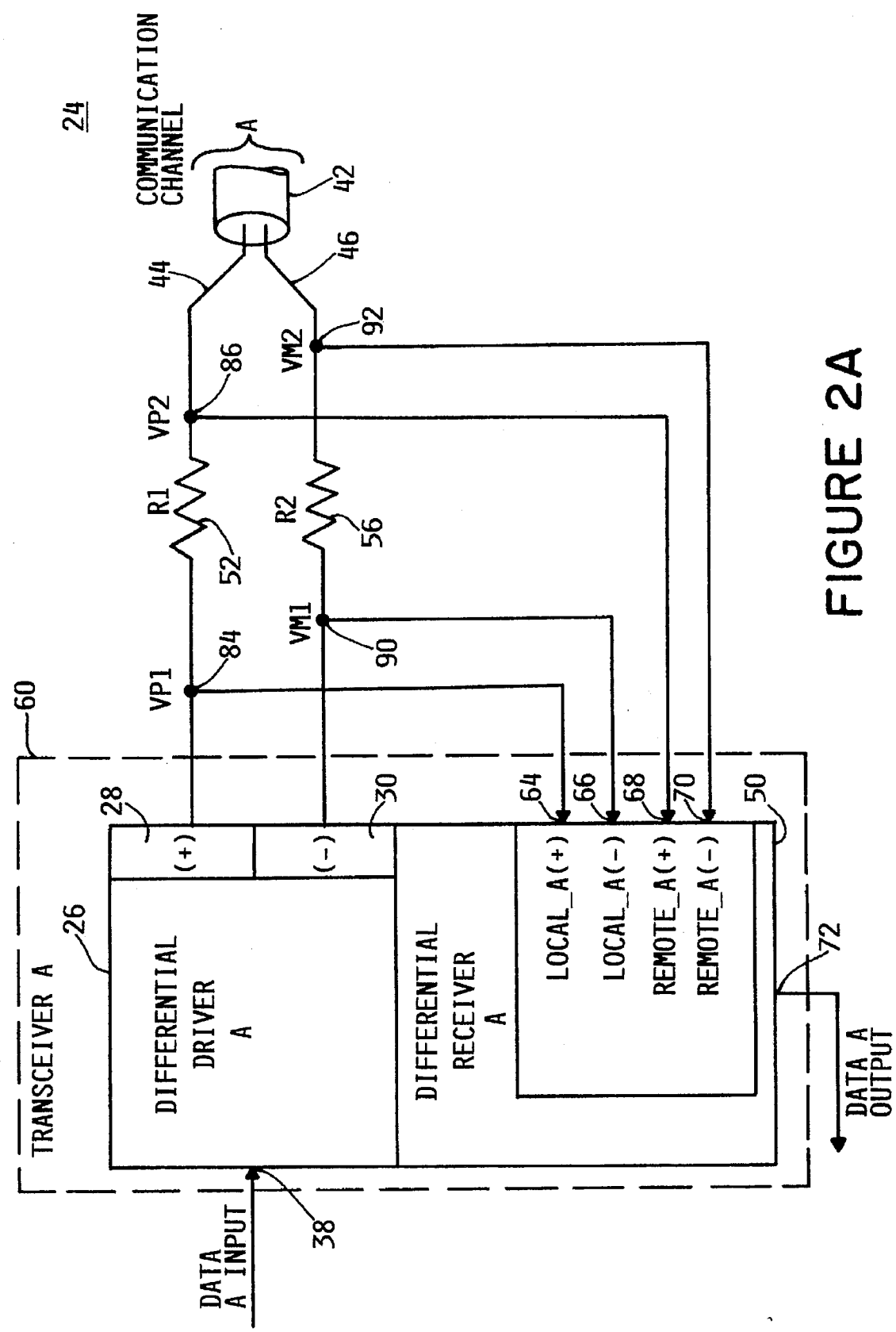
FIG. 2 shows a differential bi-directional link of a preferred embodiment.
Figure 2B:
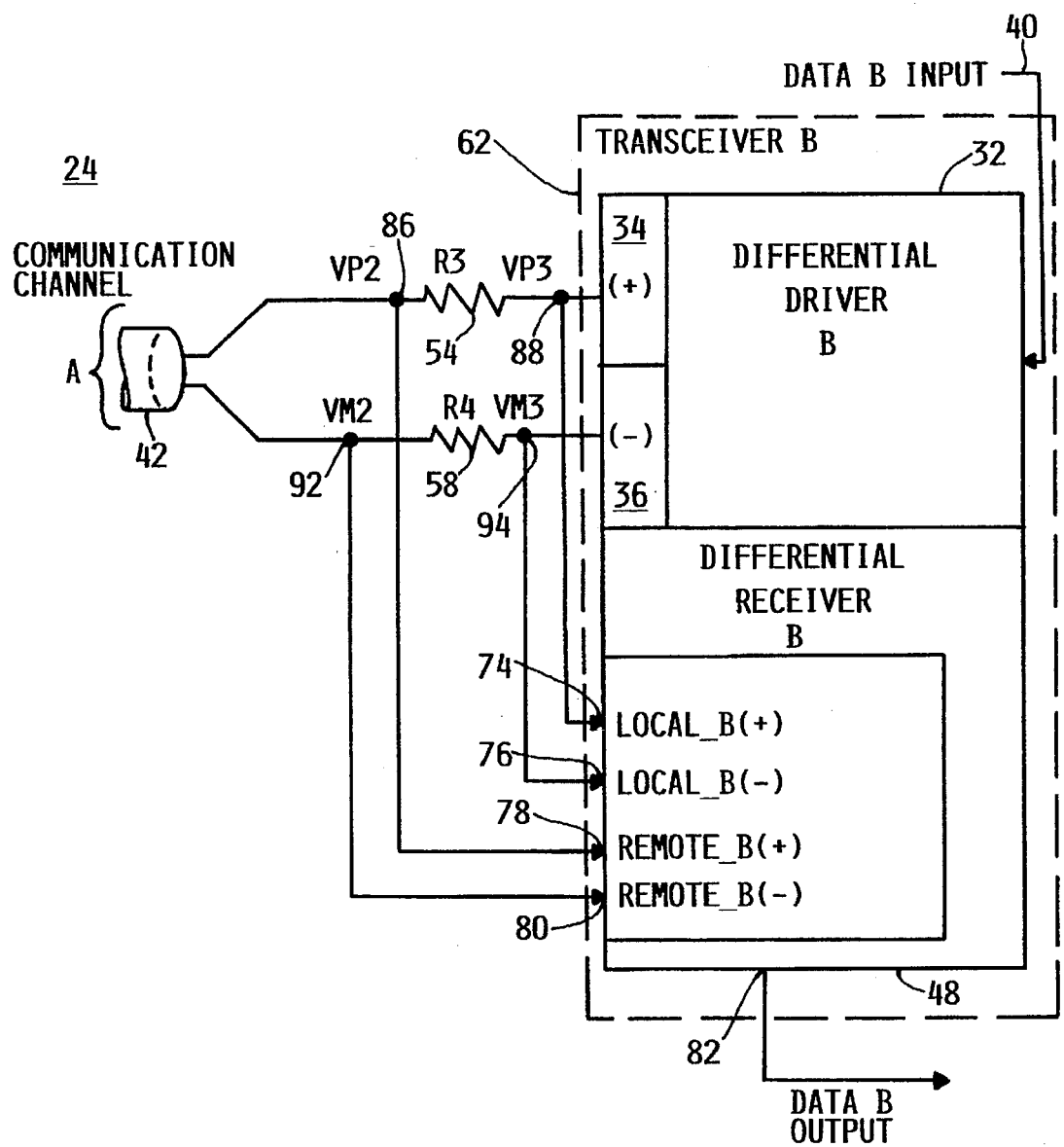

FIG. 2 shows the differential bi-directional link 24 of the preferred embodiment. A differential bi-directional link is preferred due to the increase in noise tolerance over single-wire, or uni-directional, links.

Differential driver A 26 includes a plus (+) terminal 28 for outputting a data signal, and a minus (−) terminal 30 for outputting the data signal complement. Similarly, differential driver B 32 includes plus (+) terminal 34 and minus (−) terminal 36 for providing a data signal and complemented data signal respectively. The data signals and complemented data signals generated by differential drivers A 26 and B 32 are derived from input data at the data A input terminal 38 and the data B input terminal 40 respectively. Differential driver A 26 and differential driver B 32 are located at opposite ends of the communication channel 42, which comprises a two-wire transmission line in the preferred embodiment of the invention. The data signals from drivers A 26 and B 32 travel along line 44, and the complemented data signals are transmitted via line 46. Thus, differential driver A 26 drives data signals to differential receiver B 48, while differential driver B 32 simultaneously drives different data signals to differential receiver A 50.

When both driver A 26 and driver B 32 output the same logic level (i.e., both output a logic high or a logic low), there is no appreciable current flowing through the communication channel 42 of the bi-directional link 24, and each driver sees the equivalent of an infinite load impedance. When the drivers are driving opposite logic levels, current flows at a value determined by the line impedance and the termination resistances. The termination resistances shown on line 44 are resistor R1 52 and R3 54, and resistors R2 56 and R4 58 provide the termination resistances on line 46. The driver circuit of the present invention is able to maintain a defined output voltage over this wide range of load impedances.

A driver/receiver pair in a bi-directional link is referred to as a transceiver. Differential driver A 26 and differential receiver A 50 together comprise transceiver A 60. Transceiver B 62 includes driver B 32 and receiver B 48. The receivers within each transceiver receive four input signals, and generate one output signal in response. Receiver A 50 is coupled to the plus (+) terminal 28 of driver A 26 at the local_A(+) input terminal 64, and to the minus (−) terminal 30 of driver A 26 at the local_A(−) 66 input. Inputs remote_A(+) 68 and remote_A(−) 70 are coupled to communication channel 42 at the remote ends of R1 52 and R2 56 respectively. Receiver A 50 outputs the received data at the data A output 72. An analogous configuration is shown in differential receiver B 48, which has local B_(+) 74, local_B(−) 76, remote_B(+) 78 and remote_B(−) 80 as its inputs, and data B output 82 provides the output for receiver B's 48 received data. The theory behind the configuration for the differential bi-directional link will become apparent in the ensuing description.

Figure 3:
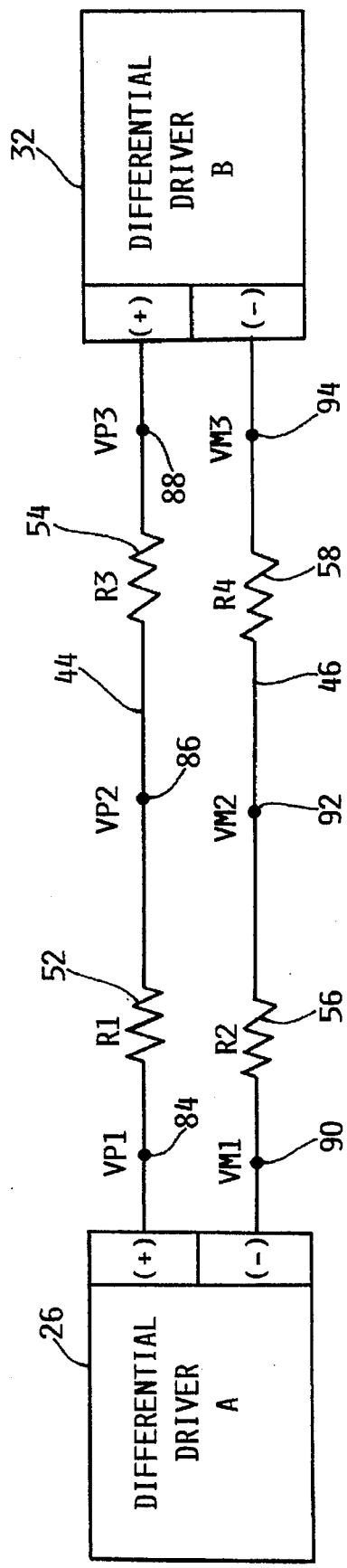
FIG. 3 shows termination resistances on a communications channel, from which an operating principal of the differential bi-directional link can be analyzed.

The operating principal of the differential bi-directional link 24 can be seen in FIG. 3. The voltages on the communication channel, consisting of line 44 and line 46, are determined by the driver output voltages at each driver, and the termination resistances which form a voltage divider. For ease of illustration, the termination resistances R1 52, R2 56, R3 54 and R4 58 are assumed to have equal values. However, proper function of the receiver does not require equal resistance values. Assuming equal resistance values, the voltages on lines 44 and 46 are given by equations 1 and 2 below:

Equation 1:

$$VP2 = VP1 + \left( \frac{VP3 - VP1}{2} \right)$$

Equation 2:

$$VM2 = VM1 + \left( \frac{VM3 - VM1}{2} \right)$$

The voltages at nodes VP1 84, VP2 86, VP3 88, VM1 90, VM2 92 and VM3 94 are also shown in FIG. 2, along with the corresponding connections to differential receivers A 50 and B 48. The manner in which the receivers act on these voltages is discussed in the subsequent operational description of the receiver.

Figure 4:
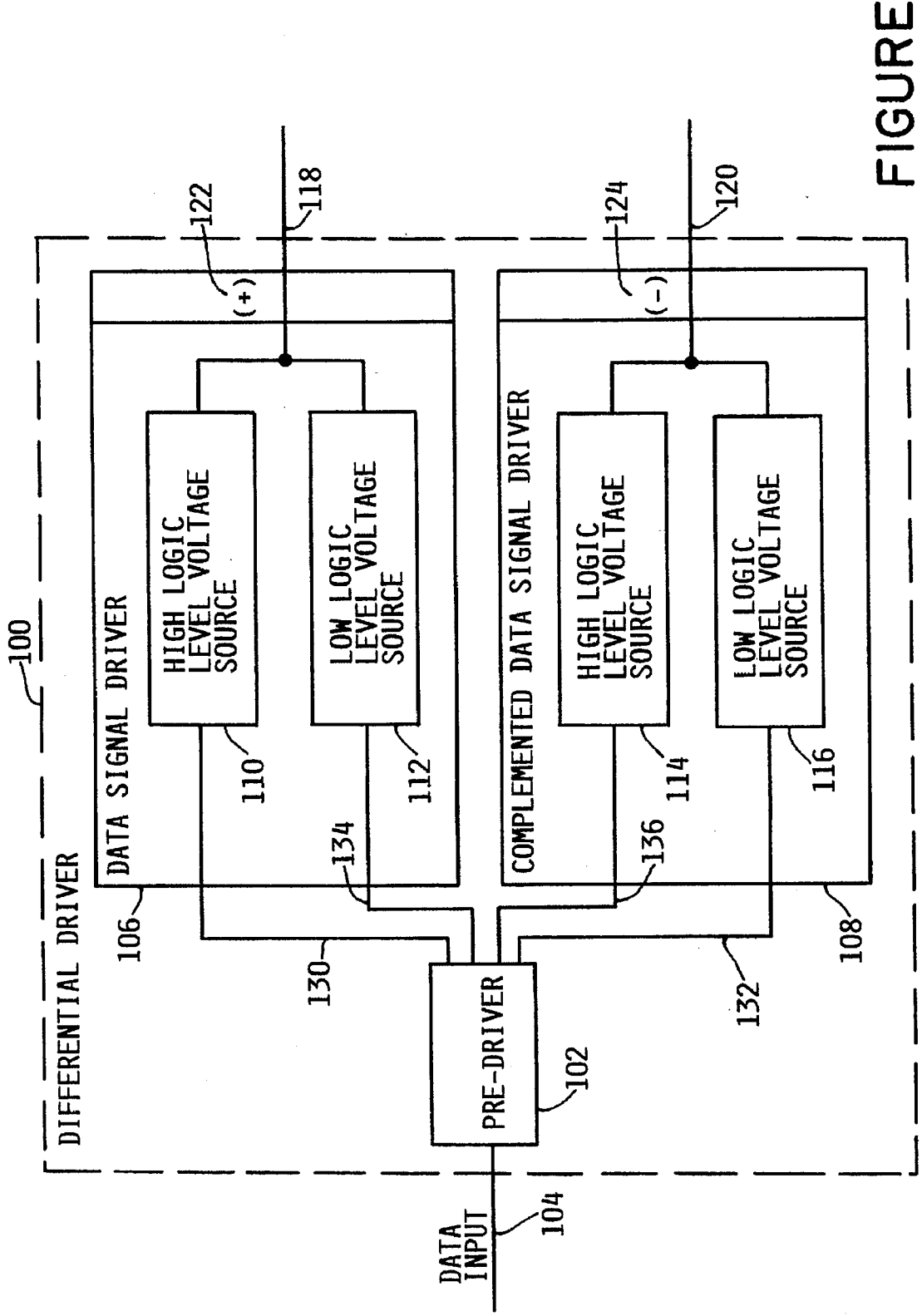
FIG. 4 is a high level diagram of a differential driver.

FIG. 4 is a high level diagram of a differential driver 100, which represents either differential driver in transceivers 60 or 62. The input data to be transmitted enters the pre-driver 102 at the data input terminal 104. The pre-driver 102 takes the input data signal and produces control signals to be used by the data signal driver 106 and complemented data signal driver 108. These control signals control the output of voltage sources 110, 112, 114 and 116, which in turn output a data signal on line 118 and a complemented data signal on line 120. When the input data is high, the control signals cause the high logic level voltage source 110 in the data signal driver 106 to generate a high logic level to be driven from the plus (+) terminal 122, and the low logic level voltage source 112 to be placed in a high impedance mode. The high input data signal will also set control signals to generate a low (complemented) logic level to be driven from the low logic level voltage source 116 of the complemented data signal driver 108 at the minus (−) terminal 124, while setting the high logic level voltage source 114 into a high impedance mode. The reverse occurs where the input data signal is a low logic level, whereby the result is a low logic level driven from the plus (+) terminal 122 on line 118, and a high logic level driven from the minus (−) terminal 124 on line 120.

Figure 5:
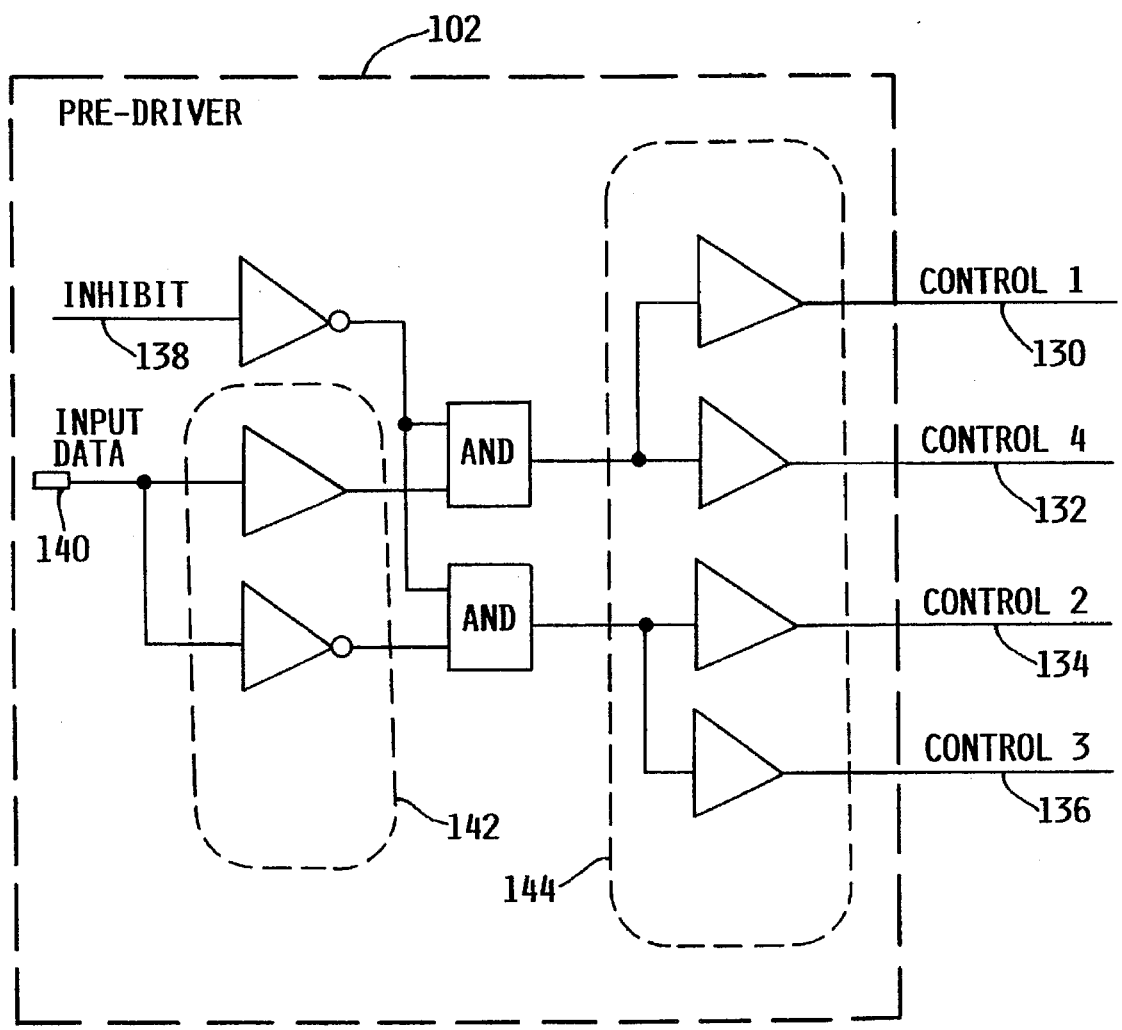
FIG. 5 depicts a representation of a pre-driver circuit.

FIG. 5 shows a representation of the pre-driver circuit 102. The pre-driver produces control signals 1, 4, 2 and 3 on lines 130, 132, 134 and 136 respectively. Assuming the inhibit signal on line 138 is at a low logic level, a high data input signal at the input data terminal 140 will cause control signals 1 and 4 to be at a high logic level. As will be described in more detail below, this will allow the high logic level voltage source 110 (FIG. 4) of the data signal driver 106 to output a high data signal, and the low logic level voltage source 116 of the complemented data signal driver 108 to output a low (complemented) data signal. Control signals 2 and 3 will output low logic levels, which will cause the low logic level voltage source 112 in the data signal driver 106 and the high logic level voltage source 114 in the complemented data signal driver 108 to go to a high impedance state. Where a low data input signal is inputted into the pre-driver 102, the low logic level voltage source 112 of the data signal driver 106 and the high logic level voltage source 114 of the complemented data signal driver 108 will be active, while voltage sources 110 and 116 will be at a high impedance state. The inhibit signal on line 138 is provided to cause all voltage sources 110, 112, 114 and 116 to enter a high impedance state by driving the four control signals on lines 130, 132, 134 and 136 to a low logic level. For proper operation of the output stages, the control signals should driven to the data signal driver 106 and complemented data signal driver 108 simultaneously. To accomplish this, the buffers shown within blocks 142 and 144 are constructed from chains of inverters in which the device sizes are adjusted so that the propagation delays are equal.

Figure 6:
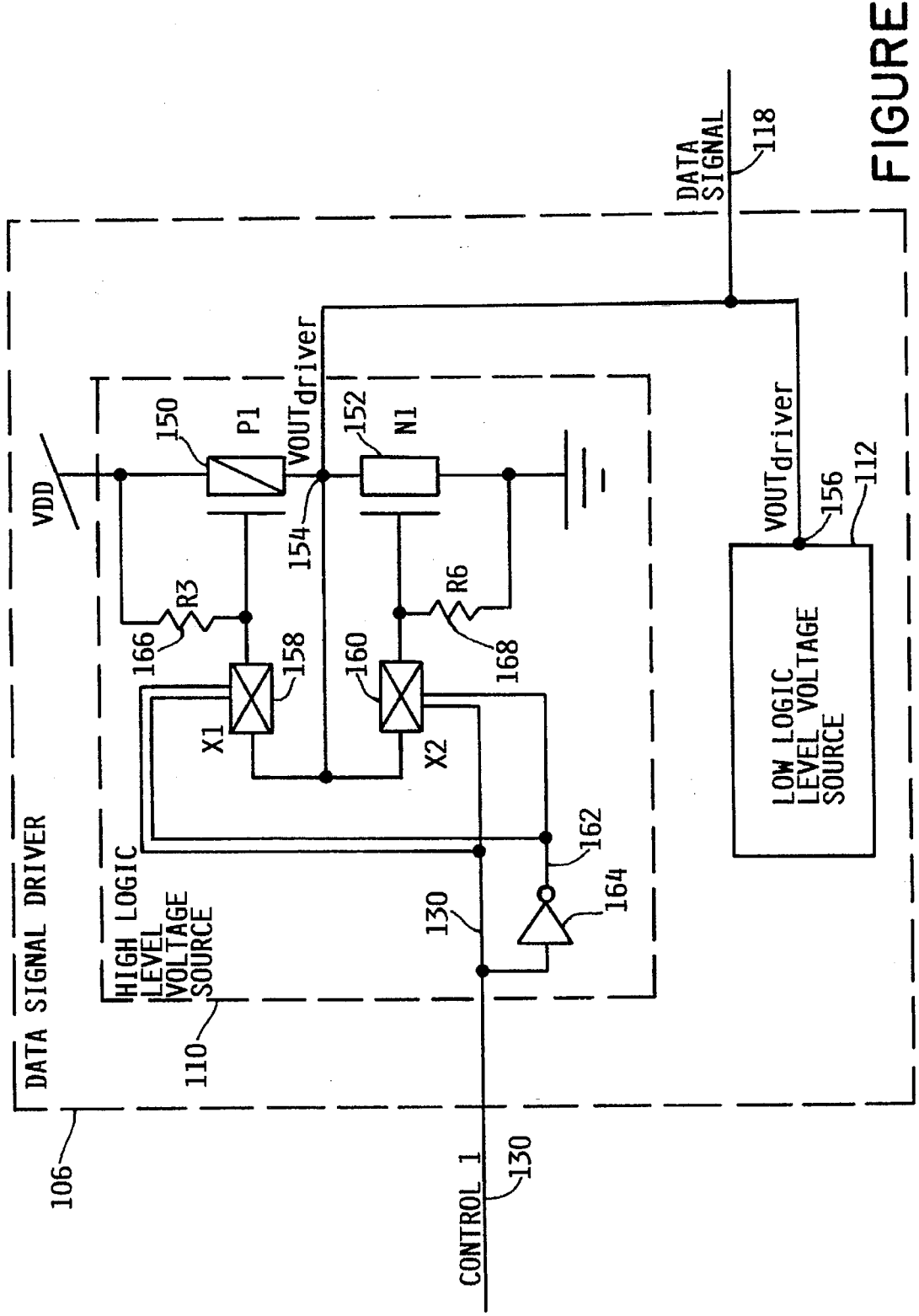
FIG. 6 is a diagram of a portion of the circuitry within a high logic level voltage source of the data signal driver.

FIG. 6 is a diagram of a portion of the circuitry within the high logic level voltage source 110 of the data signal driver 106. The bi-directional driver output stage is comprised of a PFET P1 150 and an NFET N1 152. The voltage at the $VOUT_{driver}$ 154 node is determined by the ratio of the sizes of P1 150 and N1 152. It is this ratio that will provide the correct logic level voltage, which in the case of the high logic level voltage source 110 will be a high logic level.

In order to hold the output voltage at a constant voltage level, voltage feedback from the $VOUT_{driver}$ 154 node is ultimately connected to the gates of P1 150 and N1 152. For example, if the voltage at the $VOUT_{driver}$ node 154 was to decrease, current through P1 150 will increase and the current in N1 152 will decrease, causing the voltage at the $VOUT_{driver}$ node 154 to increase to the proper output voltage. This feedback provides a constant voltage output which is advantageous over a driver circuit that relies on pull-down resistors to establish logic levels of the transmitted signal. P1 150 and N1 152 are scaled to produce the high logic level of the data signal, and a similar CMOS gate is provided in the low logic level voltage source 112 to produce the low logic level of the data signal. The desired differential signal is transmitted by selecting either the high or low data signal within the data signal driver 106, and the high or low complemented data signal from the complemented data signal driver 108. The use of a CMOS gate having feedback provides constant voltage sourcing for these data signals and complemented data signals, which allows the magnitude of the transmitted signal to be reduced, and requires less bias current than pull-down resistors would require. The advantages of increased common mode range and reduced power consumption result.

Each differential driver 100 uses separate voltage source circuits to establish the high logic level and low logic level output voltages. These logic levels are set by scaling the sizes of the P1 150 and N1 152 devices. As seen in FIG. 6, the $VOUT_{driver}$ nodes 154 and 156 within the high logic level voltage source 110 and the low logic level voltage source 112 are connected to produce the data signal on line 118. Since only a high logic level or a low logic level can be transmitted as the data signal on line 118 at a time, one of the voltage sources 110, 112 must be placed in a high impedance state while the other generates the desired logic level for the data signal.

The high impedance state is made possible through the use of CMOS transfer gates. These transfer gates are shown as transfer gate X1 158 and X2 160, and are placed in the feedback paths to the P1 150 and N1 152 gates respectively. Each transfer gate, X1 158 and X2 160, consists of a paralleled NFET and PFET transistor (not shown), the gates of which are connected to the control signal on line 130 or the inverted control signal on line 162 as shown. The inverted control signal on line 162 is simply the control signal 1 on line 130 inverted by inverter 164. When the control signal is true (a high logic level for the high logic level voltage source 110), transfer gates X1 158 and X2 160 will be on as a result of the control signal activating the NFET and PFET transistors (not shown) within each transfer gate. This results in a complete feedback path from the $VOUT_{driver}$ node 154 to the gates of P1 150 and N1 152, and allows a voltage level to be provided at the $VOUT_{driver}$ node 154. However, when the control signal is false (a low logic level for the high logic level voltage source 110), the feedback paths are essentially open-circuited at transfer gates X1 158 and X2 160. Any voltage at the gates of P1 150 and N1 152 will be discharged through resistance R5 166 and R6 168 respectively. This results in turning both P1 150 and N1 152 off, and establishing a high impedance state at the $VOUT_{driver}$ node 154. With the voltage at the $VOUT_{driver}$ node 154 being at a high impedance state, the data signal on line 118 can be driven by a low logic level voltage at the $VOUT_{driver}$ node 156 of the low logic level voltage source 112.

Figure 7:
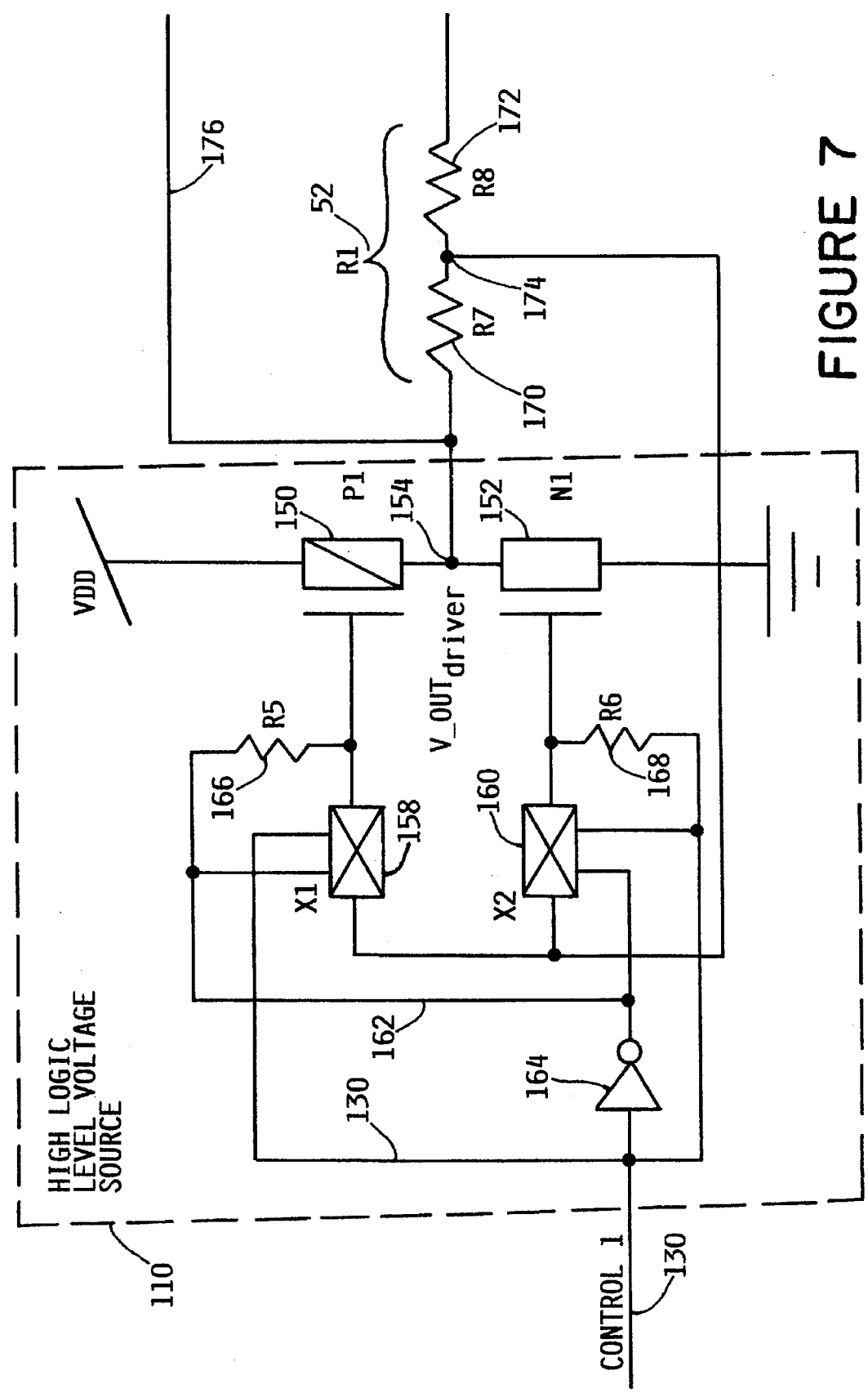
FIG. 7 shows a preferred embodiment of the high logic level voltage source as it would reside in differential driver A, along with its connection to the communication channel.

FIG. 7 shows the preferred embodiment of the high logic level voltage source 110 as it would reside in differential driver A 26, along with its connection to the communication channel 42. When the bi-directional driver is used on a bi-directional link, both a local and a remote output are required, which can be seen as nodes VP1 84 and VP2 86 of FIGS. 2 and 3. The purpose of having a local and remote output is discussed more fully in the operational analysis of the differential receiver. The local signal is obtained from the near terminal of the termination resistance, shown as resistance R1 52, which is the combination of series resistances R7 170 and R8 172. Termination resistance R1 52 is set to be substantially equal to the impedance of the transmission line 44 on which data signals will be driven. Termination resistance R1 52 is separated into two series resistors in this embodiment to help compensate for the output impedance of the voltage source 110. Resistance R7 170 is set substantially equal to the output impedance of the voltage source 110 (the output impedance is due to the intrinsic resistance of the conducting channel of the output FET). Resistance R8 172 is set to a value such that the sum of R7 170 and R8 172 is substantially equal to the transmission line 44 impedance.

In this embodiment of the invention, the feedback path originates at node 174 rather than the $VOUT_{driver}$ node 154. This change will compensate for the output impedance of the voltage source 110. Otherwise, the voltage at the $VOUT_{driver}$ node 154 (also on line 176) would decrease where current is drawn from the voltage source 110. By moving the feedback point to originate at node 174, the feedback voltage becomes a function of the output current, and the voltage decrease at the $VOUT_{driver}$ node 154 can be compensated for.

A further feature in the preferred embodiment is also shown in FIG. 7. Resistance R5 166 can be connected to the inverted control signal on line 162, and resistance R6 168 can be connected to the control signal on line 130. When the control signal is false (low logic level for the high logic level voltage source 110), the high Logic level voltage source 110 will operate normally; that is, the gates of P1 150 and N1 152 will still be discharged. However, when the control signal on line 130 is true (high logic level for the high logic level voltage source 110), current will flow through the transfer gates X1 158 and X2 160 to produce a voltage drop across the transfer gates. This will cause the gate voltage for P1 150 to be shifted toward ground, and the gate voltage for N1 152 to be shifted toward VDD. This level shifting will keep P1 150 and N1 152 operating over a wider range of common mode voltages.

Along with a differential driver in each of transceiver A 60 and transceiver B 62 of FIG. 2 is a differential receiver. As shown in FIG. 2, the receivers within each transceiver receive four input signals, and generate one output signal in response. Receiver A 50 is coupled to the plus (+) terminal 28 of driver A 26 at the local_A(+) input terminal 64, and to the minus (−) terminal 30 of driver A 26 at the local_A(−) 66 input. Inputs remote_A(+) 68 and remote_A(−) 70 are coupled to communication channel 42 at the remote ends of R1 52 and R2 56 respectively. Receiver A 50 outputs the received data at the data A output 72. An analogous configuration is shown in differential receiver B 48, which has local_B(+)74, local_B(−) 76, remote_B(+) 78 and remote_B(−) 80 as its inputs, and data B output 82 provides the output for receiver B's 48 received data.

A conventional differential receiver generates an output based on the voltage difference between two inputs. For example, a high output is generated when the plus input is greater than the minus input. However, a conventional differential receiver will not operate correctly on a bi-directional link, where data signals are simultaneously transmitted in both directions along a transmission line.

Figure 8:
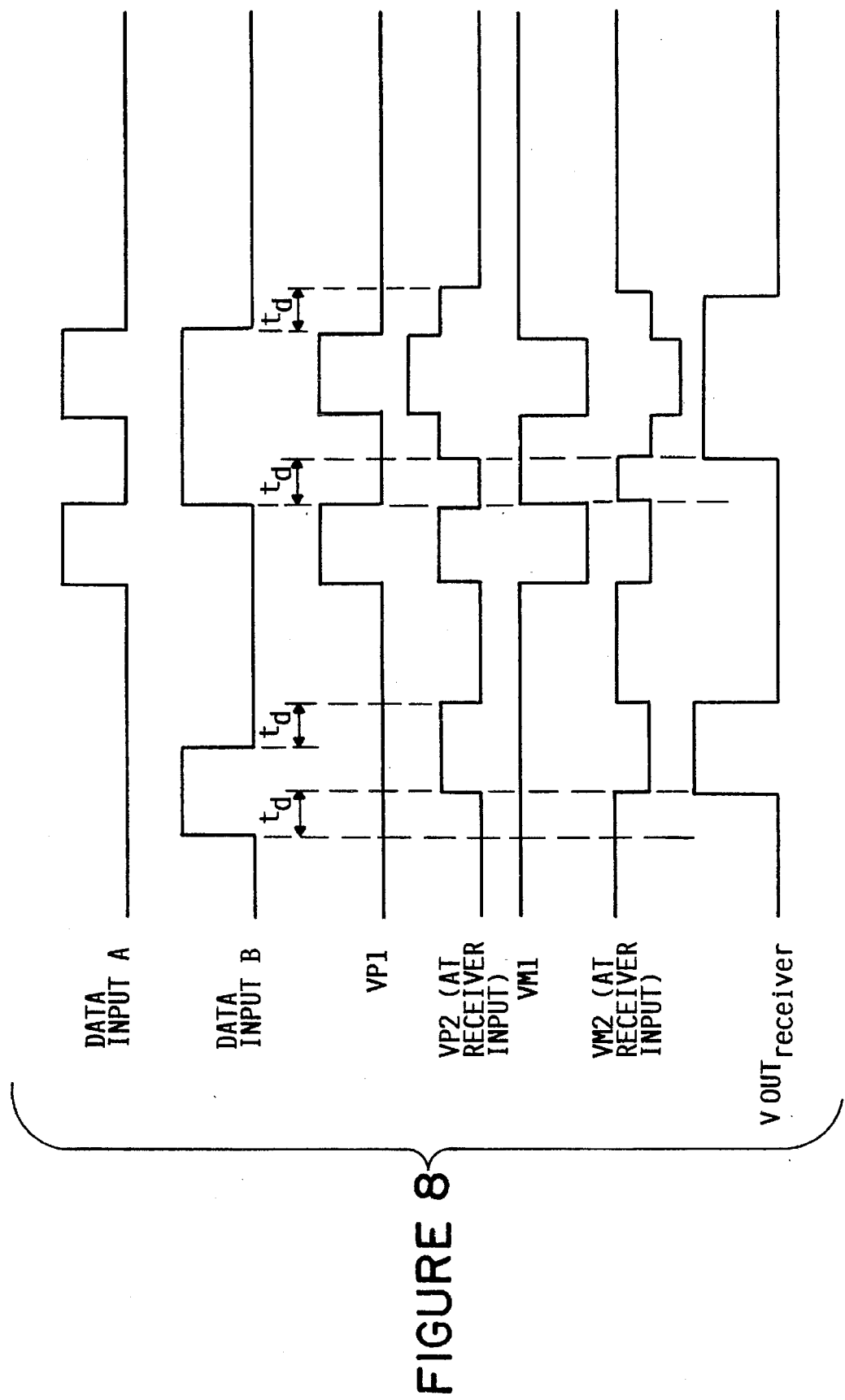
FIG. 8 is a waveform diagram showing voltages detected at inputs of differential receiver A for the given input data at data input A and data input B.

FIG. 8 is a waveform diagram showing the voltages seen at the inputs of differential receiver A 50 for the given input data at data input A 38 and data input B 40. The time delay, labeled $t_d$ represents the time delay from the time the input data enters and passes through differential driver B 32, and propagates along the communication channel 42 to the inputs of differential receiver A 50. Therefore, the voltages represented at nodes VP2 86 and VM2 92 in FIG. 8 are represented as they would appear to the differential receiver A 50, which includes the propagation delay, or time delay $t_d$, inherent in transmitting data across the communication channel 42. It should be noted that FIG. 8 is representative of timing characteristics of the signals and of the relative voltage levels, and is not representative of the actual voltage levels. In the preferred embodiment, the data input A and data input B signals are of greater magnitude than the voltages at nodes VP1 84, VP2 86, VM1 90 and VM2 92. This is due to the use of the CMOS constant voltage sources and associated feedback in the differential drivers, which provides constant voltage sourcing for the data signals and complemented data signals, and allows the magnitude of the transmitted signal to be reduced. The reduced-magnitude data signals are then amplified in the differential receivers. Therefore, FIG. 8 does not represent actual voltage levels.

An analysis of these waveforms shows that there are three voltage levels seen at the inputs of differential receiver A 50. The mathematical representation of these three signals was given previously in equations 1 and 2. Where the local and remote drivers (differential driver A 26 and B 32 respectively in this example) both generate high logic levels, the voltage at node VP2 86 will be a logic high, and the voltage at node VM2 92 will be a logic low. Where the local and remote drivers both generate low logic levels, the voltage at node VP2 86 will be a logic low, and the voltage at node VM2 92 will be a logic high. However, where the local and remote drivers are at opposite logic levels, the voltage at nodes VP2 86 and VM2 92 will go to the same voltage level, which in this example will be the voltage midpoint between the low and high voltage levels of the data signals. Thus, the voltages on the communication cable are derived from a combination of the local and remote driver voltages, and do not resemble the data signals sent by either individual driver. It is for this reason that the differential bi-directional receiver must monitor the local driver as well as receive signals from a remote driver.

The receiver can separate the signals sent to it by the remote driver from those signals on the line from the local driver by implementing the following function in equation 3:

Equation 3:

$$VOUT_{receiver} = A * \left( \left( VP2 + \frac{VM1}{2} \right) - \left( VM2 + \frac{VP1}{2} \right) \right)$$

(where A is the overall gain of the receiver)
Assuming equal termination resistance values, equations 1 and 2 previously described can be substituted into equation 3, which results in equation 4 below:

Equation 4:

$$VOUT_{receiver} = A * \left( \frac{VP3}{2} - \frac{VM3}{2} \right)$$

As seen from equation 4, the receiver output ($VOUT_{receiver}$) is dependent only on the remote driver's output voltage. FIG. 8 shows $VOUT_{receiver}$, which tracks the input data at the data B input 40, offset by $t_d$ (additional propagation delays as a result of the circuitry of differential receiver A 50 are not shown in FIG. 8).

Figure 9A:
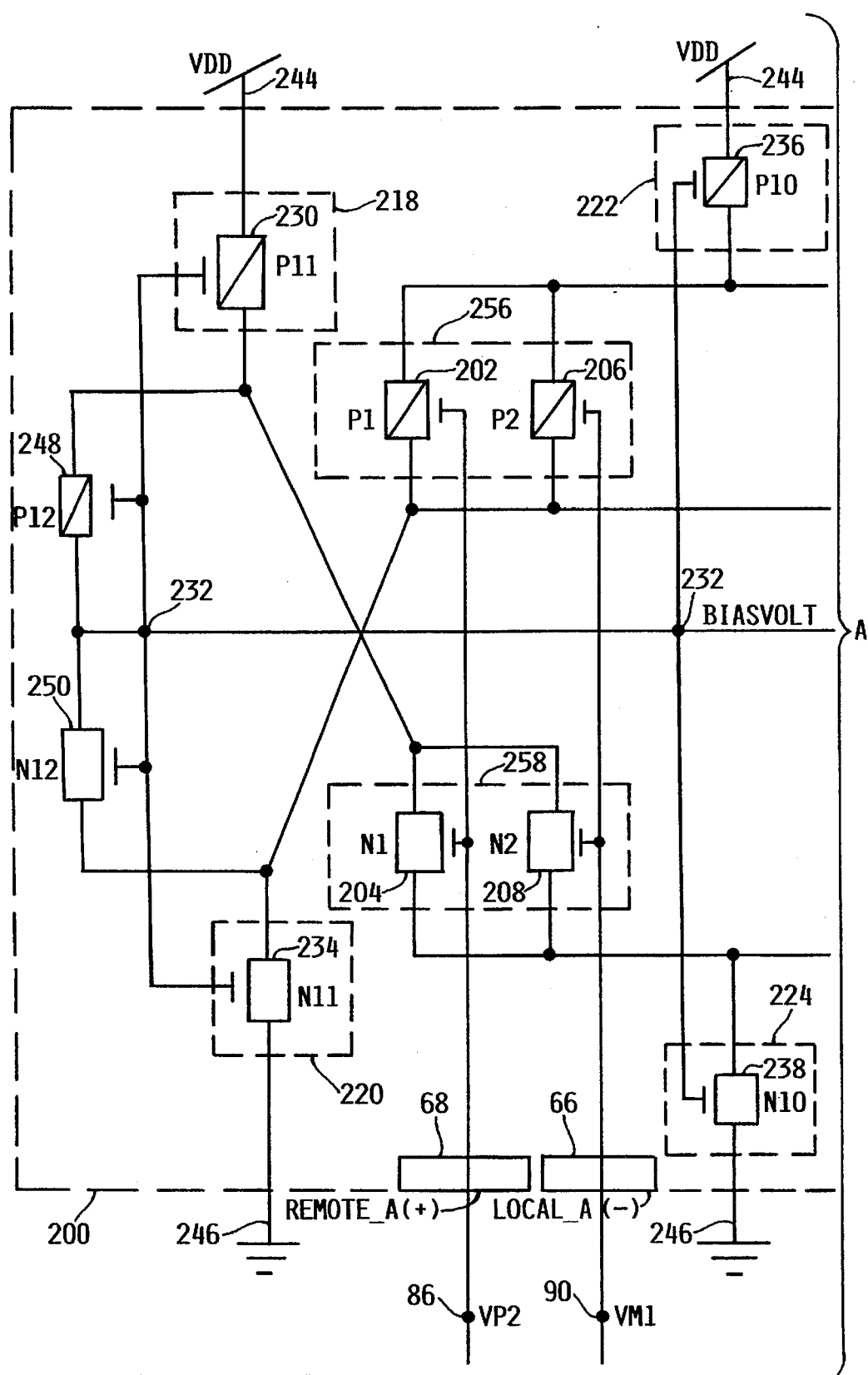
FIG. 9 is a diagram of a portion of differential receiver A.
Figure 9B:
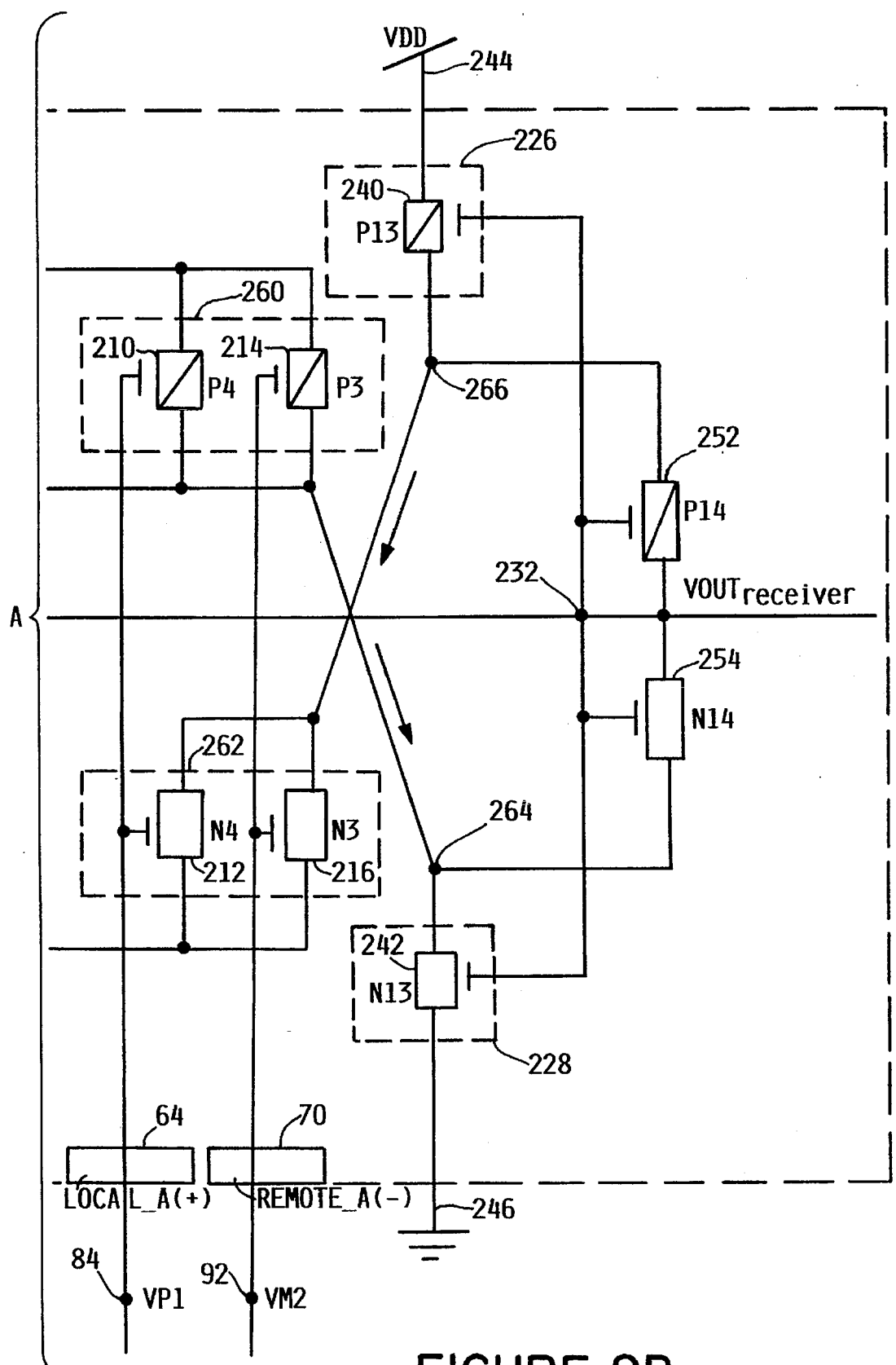

FIG. 9 is a diagram of a portion of differential receiver A 50, labeled as block 200. The circuitry within block 200 is described with reference to differential receiver A 50, but the analysis is equally applicable to differential receiver B 48. The remote_A(+) 68 input is coupled to the gates of PFET P1 202 and NFET N1 204. The local_A(−) 66 input is coupled to the gates of PFET P2 206 and NFET N2 208. The local_A(+) 64 input is coupled to the gates of PFET P4 210 and NFET N4 212. Finally, the remote_A(−) 70 input is coupled to the gates of PFET P3 214 and NFET N3 216. These four inputs receive the data signal voltages present at nodes VP2 86, VM1 90, VP1 84 and VM2 92 respectively (also shown in FIG. 2). Current sources 218, 220, 222, 224, 226 and 228 provide constant currents at various nodes throughout the circuit. Current source 218 comprises a PFET labeled P11 230 whose gate is coupled to node 232. Similarly, current source 220 comprises an NFET labeled N11 234, current source 222 comprises a PFET labeled P10 236, current source 224 comprises an NFET labeled N10 238, current source 226 comprises a PFET labeled P13 240, and current source 228 comprises an NFET labeled N13 242, whose gates are all coupled to the BIASVOLT voltage at node 232. These transistors have constant gate-to-source voltages. The PFET (P11 230, P10 236, P13 240) sources are coupled to the supply voltage VDD 244, and the NFET (N11 234, N10 238, N13 242) sources are coupled to ground 246. The BIASVOLT voltage is generated at the interconnecting point between transistors P12 248 and N12 250, labeled node 232. A feedback connection to P10 236, P11 230, P12 248, P13 240, P14 252, N10 238, N11 234, N12 250, N13 242 and N14 254 establishes a constant bias voltage (BIASVOLT) at the gates of each of these transistors by way of node 232. This self-biasing technique eliminates the need for providing additional biasing voltages.

The transistor pairs labeled pair 256, pair 258, pair 260 and pair 262 implement a portion of the function of equation 3 for separating the remote and local signals. Pair 256, comprising PFETs P1 202 and P2 206, performs a summing function of the signals at the remote_A(+) input 68 and the local_A(−) input 66. The current in P1 202 is a function of the input voltage VP2 at the remote_A(+) input 68, and the current in P2 206 is a function of the input voltage VM1 at the local_A(−) input 66. PFETs P1 202 and P2 206 are scaled such that an equal input voltage at the gates of P1 and P2 would result in a current in P2 half the magnitude of the current in P1. NFETs N1 204 and N2 208 in pair 258 similarly provide a complementary function whereby the current in N2 is half the magnitude of the current in N1. This provides the following portion of equation 3:

$$VP2 + \frac{VM1}{2}.$$

Pair 260, comprising PFETs P3 214 and P4 210, performs a summing function of the signals at the remote_A(−) input 70 and the local_A(+) input 64. The current in P3 214 is a function of the input voltage VM2 at the remote_A(−) input 70, and the current in P4 210 is a function of the input voltage VP1 at the local_A(+) input 64. PFETs P3 214 and P4 210 are also scaled such that an equal input voltage at the gates of P3 and P4 would result in a current in P4 half the magnitude of the current in P3. NFETs N3 216 and N4 212 in pair 262 similarly provide a complementary function whereby the current in N4 is half the magnitude of the current in N3. This provides the following portion of equation 3:

$$VM2 + \frac{VP1}{2}.$$

An example of the operation of block 200 in FIG. 9 can be described where the remote driver, differential driver B 32 in this example, switches its output from a high to a low logic level. The plus (+) terminal 34 of differential driver B 32 would transition from a high to a low logic level, and the minus (−) terminal 36 of differential driver B would transition from a low to a high logic level. This results in the voltage at node VP2 86 decreasing at the remote_A(+) input 68, and the voltage at node VM2 92 increasing at the remote_A(−) input 70. As the voltage at the remote_A(+) input 68 decreases, the current in P1 202 increases, and the current in N1 204 decreases. As the voltage at the remote_A(−) input 70 increases, the current in P3 214 decreases, and the current in N3 216 increases. The currents in P2 206, N2 208, P4 210 and N4 212 remain unchanged at this point. Therefore, the sum of the currents in pair 260 decreases, causing the voltage at node 264 to decrease. Decreasing the voltage at node 264 causes NFET N14 254 to conduct, where the gate of N14 254 is coupled to the BIASVOLT voltage at node 232. When the source of N14 254 decreases as a result of a voltage decrease at node 264, the total gate-to-source voltage increases, thereby turning N14 254 on.

Meanwhile, the sum of the currents in pair 262 is increasing because the current in NFET N3 216 is increasing. This causes the voltage at node 266 to decrease, which results in a reduction of gate-to-source voltage in PFET P14 252, thereby turning P14 off. With N14 254 conducting and P14 252 off, the output voltage VOUT$_{receiver}$ will be pulled down to a low logic level, which tracks the state of the logic transition in the remote driver. The BIASVOLT voltage on node 232 will remain constant.

By analogy, it is also clear that a remote driver transition from a low to a high logic level would produce a low to high voltage transition at VOUT$_{receiver}$. An analogous sequence of events would occur, but the voltages at nodes 264 and 266 would be increasing, resulting in N14 254 turning off and P14 252 turning on. This would provide a high logic level at VOUT$_{receiver}$, which would track the state of the logic transition in the remote driver.

Figure 10A:
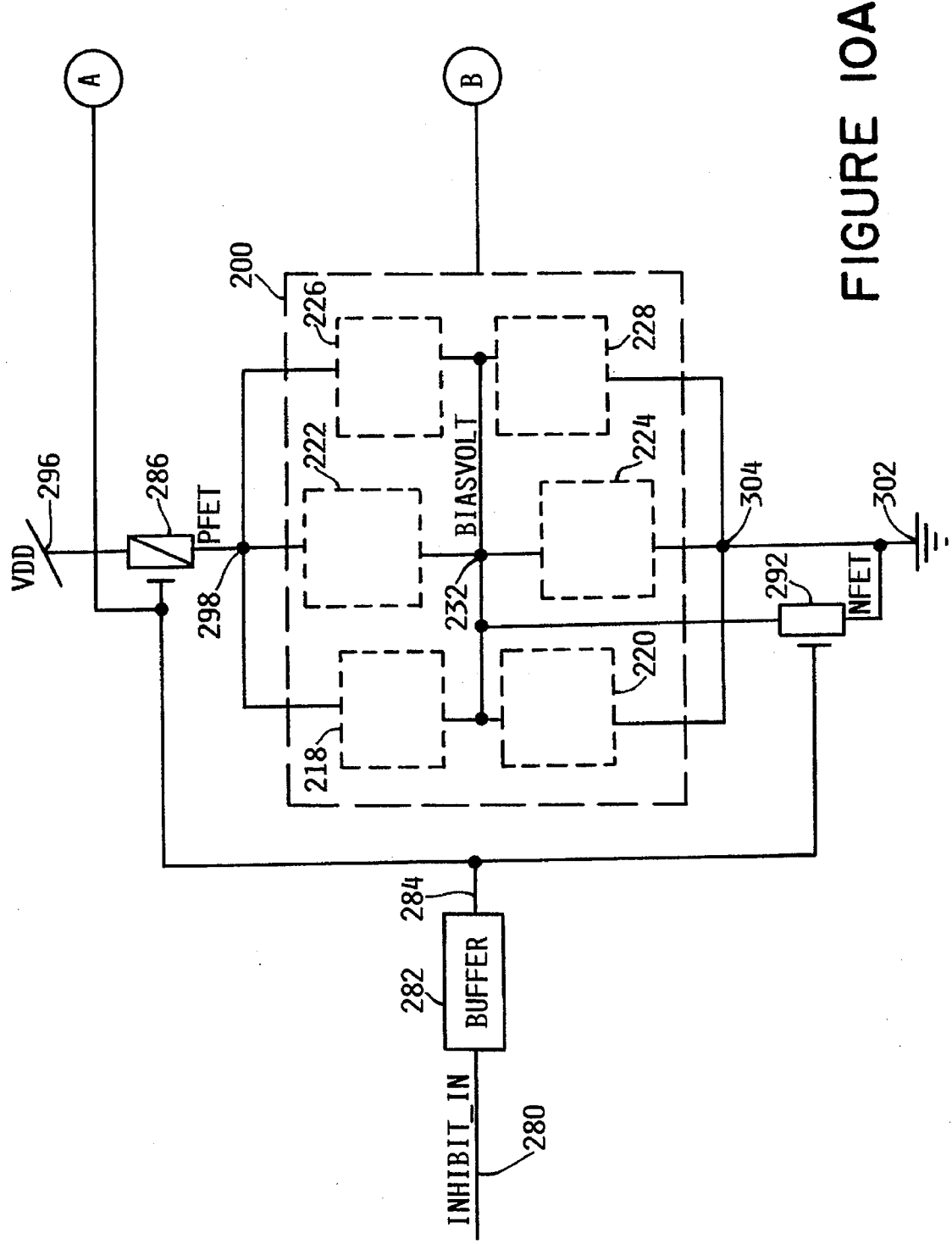
FIG. 10 shows a preferred embodiment of a differential receiver, including buffering circuitry, and circuits for selectively inhibiting the differential receiver output.
Figure 10B:
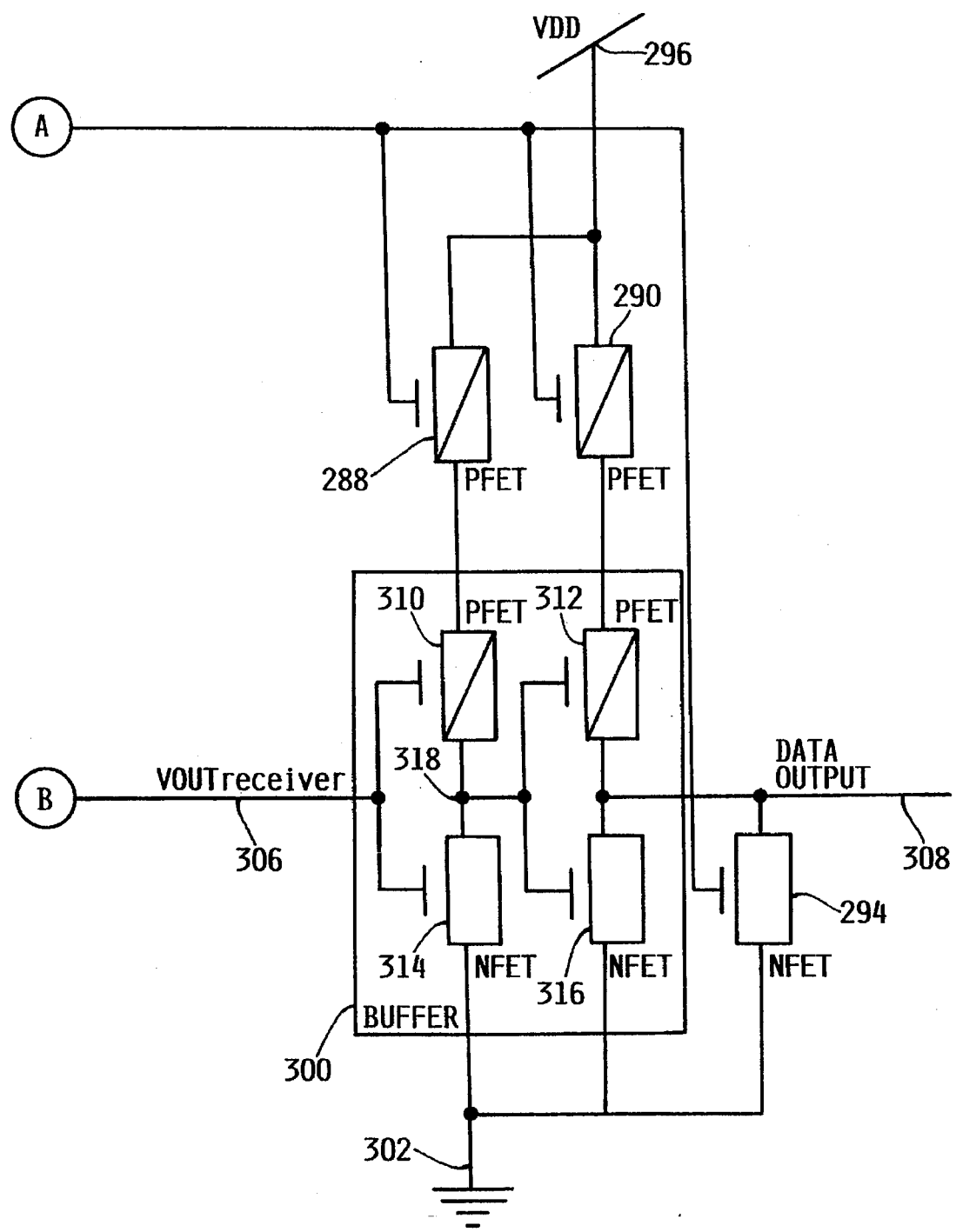

FIG. 10 shows the preferred embodiment of the differential receiver, including buffering circuitry, and circuits for selectively inhibiting the differential receiver output. Again, the circuitry is described with reference to differential receiver A 50, but the analysis is equally applicable to differential receiver B 48.

The INHIBIT_IN signal on line 280 allows the DC bias current to be turned off and forces the receiver output to a known logic state. The INHIBIT_IN signal is first buffered by buffer 282, which outputs a buffered INHIBIT_IN signal on line 284. This signal is routed to the gates of PFETs 286, 288 and 290, and also to the gates of NFETs 292 and 294. These PFETs and NFETs are switches that are controlled by the buffered INHIBIT_IN signal on line x. PFETs 286, 288 and 290 are turned off upon receipt of an active INHIBIT_IN signal, which in the preferred embodiment is a high logic level. This inhibits the flow of current from the supply voltage VDD 296 to block 200 via node 298. Node 298 is coupled to current sources 218, 222, and 226 of block 200, and current flows through PFET 286 to these current sources only when PFET 286 is turned on. Similarly, PFETs 288 and 290 turn off when the buffered INHIBIT_IN signal on line 284 is at a high logic level, which inhibits current flow into buffer 300.

An active INHIBIT_IN signal on line 284 also cause NFETs 292 and 294 to turn on. Turning NFET 292 on causes the bias voltage (BIASVOLT) at node 232 to be pulled to a low logic level. Current sources 220, 224 and 228 are coupled to ground 302 via node 304. The BIASVOLT voltage at node 232 and node 304 will both have voltage levels near ground 302. Any voltage at the VOUT$_{receiver}$ output on line 306 will not be driven through buffer 300, and NFET 294 (which is turned on when the INHIBIT_IN signal is active) will pull the DATA OUTPUT signal on line 308 to a low logic level. The DATA OUTPUT signal on line 308 corresponds to the data A output 72 of differential receiver A 50 and the data B output 82 of differential receiver B 48.

When the INHIBIT_IN signal on line 280 is inactive, a valid VOUT$_{receiver}$ signal on line 306 is generated, and buffer 300 buffers the signal to produce the DATA OUTPUT signal on line 308. The buffer used in the preferred embodiment consists of two CMOS inverters in series, consisting of PFETS 310 and 312, and NFETS 314 and 316. A high logic level on line 306 will turn NFET 314 on and turn PFET 310 off, which results in a voltage level at node 318 being relatively close to ground 302. The CMOS inverter comprising PFET 312 and NFET 316 inverts the signal at node 318 to regenerate the high logic level from line 306 as the DATA OUTPUT signal on line 308. The inverse is true where a low logic level is applied to line 306. The operation of a CMOS inverter is well-known in the art, and need not be described in further detail.

It should be recognized that transceivers A 60 and B 62 of the preferred embodiment are substantially identical. Therefore, all foregoing descriptions referencing transceiver A 60, differential driver A 26 and differential receiver A 50 are equally applicable to transceiver B 62, differential driver B 32 and differential receiver B 48 respectively. Likewise, descriptions of transceiver B 62 and its components are equally applicable to transceiver A 60 and its components.

The invention is susceptible to various modifications, modes of operation and embodiments. Accordingly, what is intended to be protected by Letters Patents is to be limited only in accordance with the appended claims.

What is claimed is:

1. A full-duplex, bi-directional, differential link for transmitting differential data signals, the differential link comprising:

a transmission line, having a first terminal at one end, and a second terminal at the opposite end;

a first differential Complementary Metal-Oxide Semiconductor (CMOS) transceiver coupled to the first terminal, the first CMOS transceiver comprising a first differential CMOS driver having a first CMOS constant voltage source to drive the differential data signals, and a first differential CMOS receiver having a first self-biased differential amplifier; and a second differential CMOS transceiver coupled to the second terminal, the second differential CMOS transceiver comprising a second differential CMOS driver having a second CMOS constant voltage source to drive the differential data signals, and a second differential CMOS receiver having a second self-biased differential amplifier.

2. The differential link as in claim 1, wherein the first and second self-biased differential amplifiers are complementary differential amplifiers.

3. The differential link as in claim 1, wherein the first and second differential CMOS receivers further comprise feedback means for providing voltage feedback within the first and second differential CMOS receivers, and for providing a bias voltage via the feedback means to eliminate the need for external or additional internally generated biasing voltages.

4. A full-duplex bi-directional differential link for transmitting differential data signals, comprising:

a transmission line, having a first terminal at one end, and a second terminal at the opposite end;

a first differential Complementary Metal-Oxide Semiconductor (CMOS) transceiver coupled to the first terminal;

a second differential CMOS transceiver coupled to the second terminal; and wherein the first and second differential CMOS transceivers each comprise:

(a) a differential CMOS driver having CMOS constant voltage sources to drive the differential data signals; and (b) a differential CMOS receiver having a complementary self-biased differential amplifier.

5. The differential link as in claim 4, wherein each of the differential CMOS drivers comprises means for generating a differential signal comprising a first signal and a second signal, the means for generating the differential signal comprising:

(a) a first pair of the CMOS constant voltage sources to generate the first signal; and (b) a second pair of the CMOS constant voltage sources to generate the second signal.

6. The differential link as in claim 5, wherein each of the differential CMOS drivers further comprises means for causing one of the CMOS constant voltage sources within each of the first and second pairs to enter a high impedance state while the other ones of the CMOS constant voltage sources within the first and second pairs generates the first and second signals respectively.

7. The differential link as in claim 4, wherein each of the CMOS constant voltage sources comprises:

a serially-connected PFET/NFET pair, having an NFET transistor gate and a PFET transistor gate, and further having a common interconnecting node adapted to provide an output voltage at an output terminal; and a feedback path for providing a feedback signal from the common interconnecting node to the NFET and PFET transistor gates of the PFET/NFET pair to cause the output voltage to remain at a constant voltage level.

8. The differential link as in claim 7, wherein each of the CMOS constant voltage sources further comprises transfer gates serially connected in the feedback path to the NFET and PFET transistor gates to disable the feedback signal to the NFET and PFET transistor gates in response to one of a plurality of voltage source control signals, thereby placing the output terminal in a high impedance state.

9. The differential link as in claim 8, wherein the differential CMOS driver in each of the first and second differential CMOS transceivers further comprises a pre-driver for generating the plurality of voltage source control signals in response to driver input data.

10. The differential link as in claim 9, wherein the pre-driver comprises means for simultaneously transmitting the plurality of voltage source control signals.

11. The differential link as in claim 9, wherein the pre-driver comprises inhibiting means for forcing selected ones of the plurality of voltage source control signals to a logic state which disables the feedback signal to the NFET and PFET transistor gates.

12. The differential link as in claim 8, wherein each of the CMOS constant voltage sources further comprises level shifting means, coupled to the transfer gates, for shifting the voltage of the feedback signal to the NFET and PFET transistor gates to widen the range of supply voltages in which the PFET/NFET pair can maintain operation in a transistor saturation region.

13. The differential link as in claim 7, wherein:

each of the CMOS constant voltage sources comprises an output impedance;

the transmission line comprises a transmission line impedance; and the output terminal comprises:

(a) local output means for providing a local voltage signal terminated by a first resistance approximately equal to the output impedance of the CMOS constant voltage source; and (b) remote output means for providing a remote voltage signal terminated by a second resistance approximately equal to the transmission line impedance.

14. The differential link as in claim 4, wherein the complementary self-biased differential amplifier comprises a common bias voltage node coupled to a plurality of current sources to concurrently provide a common bias voltage to each of the current sources.

15. The differential link as in claim 4, wherein the differential CMOS receiver within the first differential CMOS transceiver further comprises first signal separation means for separating first differential signals generated by the differential CMOS driver within the first differential CMOS transceiver from a collective signal on the transmission line, wherein the collective signal comprises the first differential signals and simultaneously-transmitted second differential signals generated by the differential CMOS driver within the second differential CMOS transceiver.

16. The differential link as in claim 15, wherein the differential CMOS receiver within the second differential CMOS transceiver further comprises second signal separation means for separating the second differential signals from the collective signal on the transmission line.

17. A differential Complementary Metal-Oxide Semiconductor (CMOS) transceiver for use with a full duplex bi-directional differential communications link for transmitting a differential signal, the transceiver comprising:
   (a) a differential driver having a plurality of CMOS constant voltage sources to drive the differential signal; and
   (b) a differential receiver having a self-biased differential CMOS amplifier.

18. The transceiver as in claim 17, wherein:
   (a) a first pair of the plurality of CMOS constant voltage sources comprises means for generating a first signal of the differential signal; and
   (b) a second pair of the plurality of CMOS constant voltage sources comprises means for generating a second signal of the differential signal which is the complement of the first signal.

19. The transceiver as in claim 18, wherein the differential driver further comprises means for causing one of the plurality of CMOS constant voltage sources within each of the first and second pairs to enter a high impedance state while the other ones of the plurality of CMOS constant voltage sources within the first and second pairs generates the first and second signals respectively.

20. The transceiver as in claim 17, wherein each of the plurality of CMOS constant voltage sources comprises:
   a serially connected PFET/NFET pair, having an NFET transistor gate and a PFET transistor gate, and further having a common interconnecting node adapted to provide an output voltage at an output terminal; and
   a feedback path for providing a feedback signal from the common interconnecting node to the NFET and PFET transistor gates to cause the output voltage to remain at a constant voltage level.

21. The transceiver as in claim 20, wherein each of the plurality of CMOS constant voltage sources further comprises transfer gates serially connected in the feedback path to the NFET and PFET transistor gates to disable the feedback signal to the NFET and PFET transistor gates in response to one of a plurality of voltage source control signals, thereby placing the output terminal in a high impedance state.

22. The transceiver as in claim 21, further comprising a pre-driver for generating the plurality of voltage source control signals in response to driver input data.

23. The transceiver as in claim 22, wherein the pre-driver comprises means for simultaneously transmitting the plurality of voltage source control signals.

24. The transceiver as in claim 22, wherein the pre-driver comprises inhibiting means for forcing selected ones of the plurality of voltage source control signals to a logic state which disables the feedback signal to the NFET and PFET transistor gates.

25. The transceiver as in claim 21, wherein each of the CMOS constant voltage sources further comprises level shifting means coupled to the transfer gates, for shifting the voltage of the feedback signal to the NFET and PFET transistor gates to widen the range of supply voltages in which the PFET/NFET pair can maintain operation in a transistor saturation region.

26. The transceiver as in claim 20, wherein:
   each of the plurality of CMOS constant voltage sources comprises an output impedance;
   a transmission line coupled to the transceiver comprises a transmission line impedance; and
   the output terminal comprises:
      (a) local output means for providing a local voltage signal terminated by a first resistance approximately equal to the output impedance of the CMOS constant voltage source; and
      (b) remote output means for providing a remote voltage signal terminated by a second resistance approximately equal to the transmission line impedance.

27. The transceiver as in claim 17, wherein the self-biased differential CMOS amplifier comprises a common bias voltage node coupled to a plurality of current sources to concurrently provide a common bias voltage to each of the current sources.

28. The transceiver as in claim 17, further comprising signal separation means coupled to the self-biased differential CMOS amplifier, for separating first differential signals from a combination of the first differential signals and second differential signals which are simultaneously received by the transceiver, and for outputting a receiver signal substantially equal to one of the second differential signals.

29. The transceiver as in claim 28, wherein the signal separation means comprises:
   first differential current-summing means for receiving a non-complemented signal of the second differential signals and a complemented signal of the first differential signals, and for providing a first total current proportional to the sum of the non-complemented signal of the second differential signals and a predetermined portion of the complemented signal of the first differential signals;
   second differential current-summing means, for receiving a non-complemented signal of the first differential signals and a complemented signal of the second differential signals, and for providing a second total current proportional to the sum of the non-complemented signal of the first differential signals and a predetermined portion of the complemented signal of the second differential signals; and
   means, coupled to the first and second differential current-summing means, for providing a receiver signal equal to the difference of the first total current and the second total current.

30. The transceiver as in claim 29, wherein the predetermined portion of the complemented signal of the first and second differential signals is approximately one-half that of the non-complemented signal of the second and first differential signals respectively.

31. The transceiver as in claim 28, wherein the differential receiver comprises means for inputting the first differential signals and the second differential signals which at any given point in time can be represented by four corresponding voltages provided thereby, and wherein the differential receiver comprises means for executing the function:

$$A * \left( \left( VP2 + \frac{VM1}{2} \right) - \left( VM2 + \frac{VP1}{2} \right) \right)$$

where A is the overall gain of the differential receiver, and wherein the four corresponding voltages include VP1 and VM1 which are voltages proximate a plus terminal and a minus terminal respectively of the differential driver, and further include VP2 and VM2 which are voltages at the distal ends of first and second termination impedances having their proximal ends coupled to the plus and minus terminal respectively.

32. A full-duplex bi-directional link, for transmitting data across a transmission line having first and second termination resistances at opposite ends, comprising:
   (a) first driver means, coupled to the first termination resistance, for driving first non-complemented signals and first complemented signals from a first plurality of CMOS constant voltage sources;
   (b) second driver means, coupled to the second termination resistance, for driving second non-complemented signals and second complemented signals from a second plurality of CMOS constant voltage sources;
   (c) first receiver means, coupled to the first driver means and the first termination resistance, for receiving the first non-complemented signals, the first complemented signals, the second non-complemented signals, and the second complemented signals, comprising:
      (1) first signal-separation means for separating the first non-complemented signals and the first complemented signals from the second non-complemented signals and the second complemented signals, and for generating first received signals corresponding to the second non-complemented signals in response thereto; and
      (2) first complementary, self-biased amplification means, coupled to the first signal-separation means, for providing a first amplified output signal and for providing a first common bias voltage through feedback of the first amplified output signal; and
   (d) second receiver means, coupled to the second driver means and the second termination resistance, for receiving the second non-complemented signals, the second complemented signals, the first non-complemented signals, and the first complemented signals, comprising:
      (1) second signal-separation means for separating the second non-complemented signals and the second complemented signals from the first non-complemented signals and the first complemented signals, and for generating second received signals corresponding to the first non-complemented signals in response thereto; and
      (2) second complementary, self-biased amplification means, coupled to the second signal-separation means, for providing a second amplified output signal and for providing a second common bias voltage through feedback of the second amplified output signal.

33. A full-duplex bi-directional differential link for transmitting data, comprising:
   (a) a transmission line, having a first terminal at one end, and a second terminal at the opposite end; and
   (b) first and second differential Complementary Metal-Oxide Semiconductor (CMOS) transceivers coupled to the first and second terminals respectively, each of the first and second differential CMOS transceivers comprising:
      (i) a differential CMOS driver to drive the data, comprising:
         (1) a first pair of the CMOS constant voltage sources to generate a first signal of a differential signal; and
         (2) a second pair of the CMOS constant voltage sources to generate a second signal of the differential signal; and
      (ii) a differential CMOS receiver having a complementary self-biased differential amplifier.

34. The differential link as in claim 33, wherein each of the differential CMOS drivers further comprises means for causing one of the CMOS constant voltage sources within each of the first and second pairs to enter a high impedance state while the other ones of the CMOS constant voltage sources within the first and second pairs generates the first and second signals respectively.

35. A full-duplex bi-directional differential link for transmitting data, comprising:
   (a) a transmission line, having a first terminal at one end, and a second terminal at the opposite end; and
   (b) first and second differential Complementary Metal-Oxide Semiconductor (CMOS) transceivers coupled to the first and second terminals respectively, each of the first and second differential CMOS transceivers comprising:
      (i) a differential CMOS driver having CMOS constant voltage sources to drive the data, the CMOS constant voltage sources comprising:
         (1) a serially-connected PFET/NFET pair, having an NFET transistor gate and a PFET transistor gate, and further having a common interconnecting node adapted to provide an output voltage at an output terminal; and
         (2) a feedback path for providing a feedback signal from the common interconnecting node to the NFET and PFET transistor gates of the PFET/NFET pair to cause the output voltage to remain at a constant voltage level; and
      (ii) a differential CMOS receiver having a complementary self-biased differential amplifier.

36. The differential link as in claim 35, wherein each of the CMOS constant voltage sources further comprises transfer gates serially connected in the feedback path to the NFET and PFET transistor gates to disable the feedback signal to the NFET and PFET transistor gates in response to one of a plurality of voltage source control signals, thereby placing the output terminal in a high impedance state.

37. The differential link as in claim 36, wherein the differential CMOS driver in each of the first and second differential CMOS transceivers further comprises a pre-driver for generating the plurality of voltage source control signals in response to driver input data.

38. The differential link as in claim 37, wherein the pre-driver comprises means for simultaneously transmitting the plurality of voltage source control signals.

39. The differential link as in claim 37, wherein the pre-driver comprises inhibiting means for forcing selected ones of the plurality of voltage source control signals to a logic state which disables the feedback signal to the NFET and PFET transistor gates.

40. The differential link as in claim 36, wherein each of the CMOS constant voltage sources further comprises level shifting means, coupled to the transfer gates, for shifting the voltage of the feedback signal to the NFET and PFET transistor gates to widen the range of supply voltages in which the PFET/NFET pair can maintain operation in a transistor saturation region.

41. The differential link as in claim 35, wherein:
   each of the CMOS constant voltage sources comprises an output impedance;
   the transmission line comprises a transmission line impedance; and
   the output terminal comprises:
      (a) local output means for providing a local voltage signal terminated by a first resistance approximately equal to the output impedance of the CMOS constant voltage source; and (b) remote output means for providing a remote voltage signal terminated by a second resistance approximately equal to the transmission line impedance.

42. A differential Complementary Metal-Oxide Semiconductor (CMOS) transceiver for use with a full duplex bi-directional differential communications link for transmitting a differential signal, the transceiver comprising:

(a) a differential driver having a plurality of CMOS constant voltage sources to drive the differential signal, wherein a first pair of the plurality of CMOS constant voltage sources comprises means for generating a first signal of the differential signal, and wherein a second pair of the plurality of CMOS constant voltage sources comprises means for generating a second signal of the differential signal which is the complement of the first signal; and (b) a differential receiver having a self-biased differential CMOS amplifier.

43. The transceiver as in claim 42, wherein the differential driver further comprises means for causing one of the plurality of CMOS constant voltage sources within each of the first and second pairs to enter a high impedance state while the other ones of the plurality of CMOS constant voltage sources within the first and second pairs generates the first and second signals respectively.

44. A differential Complementary Metal-Oxide Semiconductor (CMOS) transceiver for use with a full duplex bi-directional differential communications link for transmitting a differential signal, the transceiver comprising:

(a) a differential driver having a plurality of CMOS constant voltage sources to drive the differential signal, wherein each of the plurality of CMOS constant voltage sources comprises:

(i) a serially connected PFET/NFET pair, having an NFET transistor gate and a PFET transistor gate, and further having a common interconnecting node adapted to provide an output voltage at an output terminal; and (ii) a feedback path for providing a feedback signal from the common interconnecting node to the NFET and PFET transistor gates to cause the output voltage to remain at a constant voltage level; and (b) a differential receiver having a self-biased differential CMOS amplifier.

45. The transceiver as in claim 44, wherein each of the plurality of CMOS constant voltage sources further comprises transfer gates serially connected in the feedback path to the NFET and PFET transistor gates to disable the feedback signal to the NFET and PFET transistor gates in response to one of a plurality of voltage source control signals, thereby placing the output terminal in a high impedance state.

46. The transceiver as in claim 45, further comprising a pre-driver for generating the plurality of voltage source control signals in response to driver input data.

47. The transceiver as in claim 46, wherein the pre-driver comprises means for simultaneously transmitting the plurality of voltage source control signals.

48. The transceiver in claim 46, wherein the pre-driver comprises inhibiting means for forcing selected ones of the plurality of voltage source control signals to a logic state which disables the feedback signal to the NFET and PFET transistor gates.

49. The transceiver as in claim 45, wherein each of the CMOS constant voltage sources further comprises level shifting means coupled to the transfer gates, for shifting the voltage of the feedback signal to the NFET and PFET transistor gates to widen the range of supply voltages in which the PFET/NFET pair can maintain operation in a transistor saturation region.

50. The transceiver as in claim 44, wherein:

(a) each of the plurality of CMOS constant voltage sources comprises an output impedance;

(b) a transmission line coupled to the transceiver comprises a transmission line impedance; and (c) the output terminal comprises:

(i) local output means for providing a local voltage signal terminated by a first resistance approximately equal to the output impedance of the CMOS constant voltage source; and (ii) remote output means for providing a remote voltage signal terminated by a second resistance approximately equal to the transmission line impedance.

* * * * *